(12) United States Patent
Oberli et al.

(10) Patent No.: US 7,740,230 B2
(45) Date of Patent: Jun. 22, 2010

(54) PIG FOR INSTALLING A CABLE IN A CONDUIT

(75) Inventors: Stéphane Oberli, Bex (CH); Gérard Plumettaz, Bex (CH)

(73) Assignee: Plumettaz SA, Bex (CH)

( * ) Notice: Subject to any disclaimer, the term of this patent is extended or adjusted under 35 U.S.C. 154(b) by 592 days.

(21) Appl. No.: 10/516,972

(22) PCT Filed: Jun. 2, 2003

(86) PCT No.: PCT/CH03/00344

§ 371 (c)(1),
(2), (4) Date: Jul. 14, 2005

(87) PCT Pub. No.: WO2004/004086

PCT Pub. Date: Jan. 8, 2004

(65) Prior Publication Data

US 2006/0054874 A1    Mar. 16, 2006

(30) Foreign Application Priority Data

Jul. 1, 2002    (CH) ..................... 1143/02

(51) Int. Cl.
*E21C 29/16*    (2006.01)
(52) U.S. Cl. ............................ 254/134.4; 254/134.3 FT
(58) Field of Classification Search ........ 254/134.3 FT, 254/134.3 R, 134.4
See application file for complete search history.

(56) References Cited

U.S. PATENT DOCUMENTS

| | | | | | |
|---|---|---|---|---|---|
| 2,188,959 | A | * | 2/1940 | Schaer | 15/104.061 |
| 2,281,918 | A | * | 5/1942 | Constant et al. | 15/104.061 |
| 2,794,197 | A | * | 6/1957 | Crane | 15/104.061 |
| 2,927,830 | A | * | 3/1960 | Workman | 92/194 |
| 4,108,279 | A | * | 8/1978 | Marcell | 184/15.1 |
| 4,465,220 | A | * | 8/1984 | Ledlow et al. | 254/134.4 |
| 4,475,629 | A | * | 10/1984 | Jonnes | 184/15.1 |
| 4,783,054 | A | * | 11/1988 | Morel et al. | 254/134.4 |
| 7,617,558 | B2 | * | 11/2009 | Boe | 15/104.061 |
| 2006/0054874 | A1 | * | 3/2006 | Oberli et al. | 254/134.4 |
| 2009/0078283 | A1 | * | 3/2009 | Phipps | 134/8 |

FOREIGN PATENT DOCUMENTS

| DE | 90 14 672 U | 1/1991 |
|---|---|---|
| DE | 43 12 332 A | 10/1994 |

* cited by examiner

*Primary Examiner*—Lee D Wilson
(74) *Attorney, Agent, or Firm*—Pearne & Gordon LLP

(57) ABSTRACT

A pig for installing a cable in a conduit, in which it comprises a body and a seal intended to follow the internal surface of the conduit, the body comprising a radially elastic tubular part on which the seal is mounted, and a support part fixed to or integral with the tubular part, the support part having a guide surface intended to guide the pig in the conduit, the diameter of the guide surface being slightly less than the maximum diameter of the seal, so that the support part radially deforms the tubular part when the pig passes through deformed parts of the conduit.

11 Claims, 2 Drawing Sheets

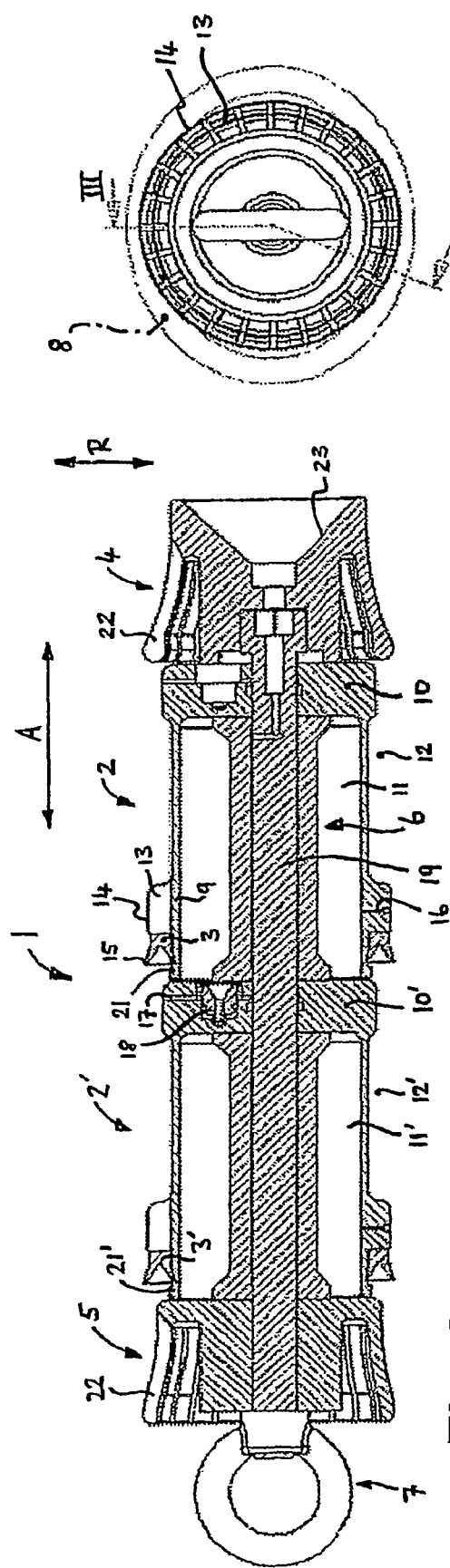
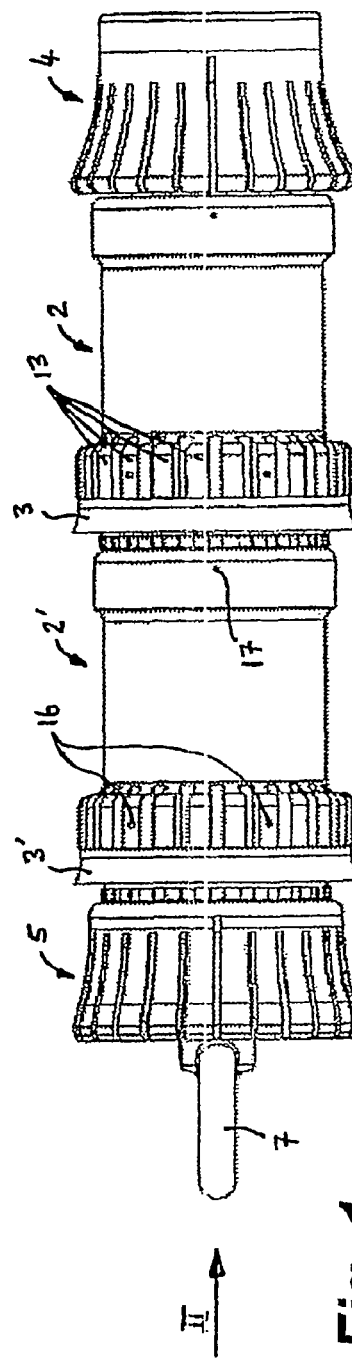

PIG FOR INSTALLING A CABLE IN A CONDUIT

BACKGROUND OF THE INVENTION

The present invention relates to the technical field of cable installations, for example optical fibre or electrical, inside buried and/or submerged installation conduits. The term "cables" must also be taken to mean tubes or the like for conveying power, fluids and electrical, light or other signals. The term "cable" also concerns low, medium and high power electrical cables, single or three-phase.

Various methods are known for installing cables within conduits. These methods are defined below.

"Pulling" means that the cable is attached by its end to a sling already installed in the conduit. This sling is attached to the drum of a winch which winds the latter and enables the cable to be installed in the conduit, by sliding the cable within the said conduit.

"Pulling-pushing" means simultaneous drawing and pushing with the use of means for pushing the cable at its entry into the conduit, in order to reduce the traction forces on the cable head and to increase the installation distance. Means of driving the cable towards the half-way mark can also be provided.

"Blowing" means that the installation conduit is put under pressure, by means of a fluid, between the cable supply means and a fluidtight pig attached to the head of the cable. The pressure prevailing inside the conduit thus moves the pig, pulling on the cable head. The pressurisation is generally effected with air.

"Blowing-pushing" means the use of means for pushing the cable at its entry into the conduit, associated with the means used in the so-called "blowing" method. There also, an increase in the cable installation distance is obtained.

"Floating-pushing" and/or "carrying-pushing" means a technique in which a fluid, generally air or water, is injected into the conduit at a speed greater than the speed of movement of the cable, and it is the friction of the fluid on the external sheath of the cable which exerts the traction force. In this installation technique, the static pressure of the air or of the liquid inside the conduit has the effect of pushing the cable out of the conduit.

In certain "pulling-pushing" techniques, water is also injected into the conduit. The traction force comes from a pig fixed to the head end of the cable on which the pressure of water injected into the conduit is exerted. For this purpose, the pig is provided with one or more seals.

One of the advantages of the techniques of injecting water or other liquids is the reduction of the bearing force of the cable against the internal wall of the conduit due to the buoyancy and consequently the friction forces. The installation distance is however limited by the maximum permissible water pressure, which is determined by the maximum pressure which can be applied to the pig.

Because of the radii of curvature in the conduit, and the deformation in an oval shape of the profiles of the conduits, existing pigs are provided with a juxtaposed series of flexible rubber lips in a conical shape or in the form of disks. These flexible lips have the great disadvantage of not withstanding a very high pressure not normally exceeding a few bar, so that the pulling force of the pig is relatively limited.

In the light of these drawbacks, one aim of the invention is to provide a pig for installing cables in conduits which makes it possible to increase the cable installation distance, that is to say the length of the cable which can be inserted in a conduit.

It is advantageous to provide a cable installation pig able to be used in installation techniques in which a liquid, for example water, is injected into the cable conduit.

It is also advantageous to provide a pig for installing cables in a conduit which is reliable and economical and which reduces or even eliminates leakages of liquid.

It is advantageous to provide a cable installation pig which can also be used for extracting a cable from a conduit.

Aims of the invention are achieved by a pig for installing cables.

SUMMARY OF THE INVENTION

In the present invention, a pig for installing a cable in a conduit comprises a body and a seal intended to follow the internal surface of the conduit, the body comprising a radially elastic tubular part on which the seal is mounted, and a support part fixed to or integral with the tubular part, the support part having a guide surface intended to guide the pig in the conduit, the diameter of the guide surface being slightly less than the maximum diameter of the seal, so that the support part radially deforms the tubular part when the pig passes through deformed parts of the conduit. The support part also acts as an axial support for the seal.

Advantageously, the fact that the axial support of the seal has a diameter approaching an outside diameter of the seal makes it possible to avoid problems of reversal of the lips of the seal and therefore to withstand higher pressures, whilst allowing radial deformation of the seal, by mounting it on an elastic tubular part which adapts to the deformations of the conduit through the support parts.

The support parts can be in the form of teeth extending radially from the tubular part of the body. These parts can be formed integrally with the body from a material offering low drag coefficients, such as certain plastics of the POM, nylon or Teflon type. The body can also comprise a radial wall partially or completely closing off one end of the tubular part, this wall serving on the one hand to stabilise the body and on the other hand to block the transfer of fluids. In order to limit the hydrostatic pressure within the body, a calibrated valve in the form of a pressure reducer can be mounted in the body, in particular in the radial wall. Advantageously, one or more radial orifices for injecting a certain quantity of water downstream of the seal are formed in the body in order to lubricate and cool the lip of the seal.

It is advantageously possible to mount two or more bodies in axial tandem so as to avoid pressure drops when there are irregularities in the conduit, for example when passing a coupling between two conduit ends.

In such a configuration, radial orifices in communication with the pressure reducer are disposed between two seals, which makes it possible to distribute the pressure between the successive seals as well as the differential pressure between the inside of the tubular part of the body and the outside. Assembling several bodies and corresponding seals also makes it possible to withstand higher water injection pressures in the conduit and therefore to increase the installation distance.

Guidance elements can be mounted at each axial end of the body or of the plurality of bodies, the whole for example fixed by fixing means comprising for example a central fixing spindle to which it is also possible to fix a ring or hook or other attachment element for attaching the end of the cable head.

The guidance elements can advantageously be provided with elastic elements, such as elastic fingers disposed on the periphery of the element, for the purpose of adapting to the deformation of the conduit.

The guidance element at the head can advantageously be provided with a conical or essentially conical receptacle for positioning it on the cable ferrule when the pig is used for extracting the cable from a conduit.

Several pigs comprise at least a body, a seal, a guide means and a pressure reducer and can be coupled by articulated fixing means.

Other advantageous characteristics and aspects of the invention will also emerge from the detailed description given below, with reference to the accompanying drawings.

BRIEF DESCRIPTION OF THE DRAWINGS

FIG. 1 is a view of an embodiment of a pig for installing a cable in a conduit according to the invention;

FIG. 2 is a view in the direction of the arrow II in FIG. 1;

FIG. 3 is a view along the lines III-III in FIG. 2;

DESCRIPTION OF THE PREFERRED EMBODIMENTS

Figure 4:
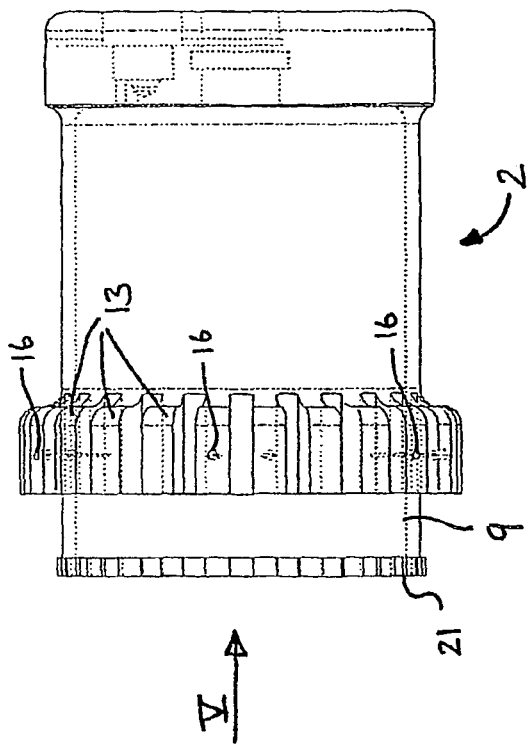
FIG. 4 is a view of a body of the pig according to the invention.
Figure 5:
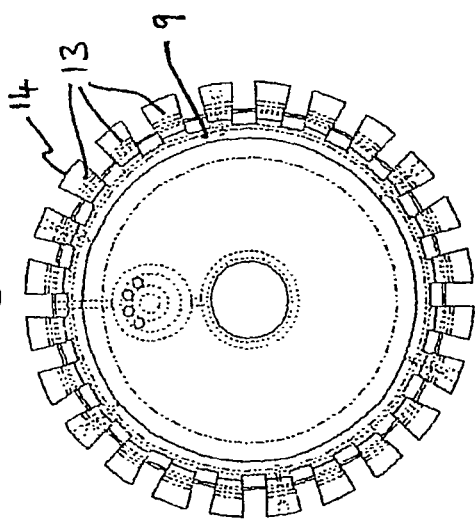
FIG. 5 is a view in the direction of the arrow V in FIG. 4.

Referring to the figures, more particularly to FIGS. 1 to 3, a pig for installing a cable in a conduit comprises a body 2, a seal 3, front and rear guidance elements 4, 5, means 6 of fixing the various parts of the pig, and an attachment member 7 for attaching the pig to one end of a cable to be installed in a conduit. A ferrule (not shown) is mounted on the end of the cable, the ferrule comprising a complementary attachment member.

The body 2 comprises a radially elastic tubular part 9, a radial walled part 10 at least partially closing off one end of the tubular part 9, with the exception of the passages for the fixing means 6 as well as orifices and cavities for receiving a valve or a pressure reducer. The wall part 10 on the one hand separates the internal cavity 11 of the body from the outside 12 and on the other hand stabilises and stiffens the body and enables it to be connected to other bodies and/or to the guidance elements 4, 5. The tubular part is, in this embodiment, essentially in the form of a hollow cylinder having a relatively thin wall in order to be radially elastic for reasons which will be understood better in the following description.

The body 2 also comprises a rigid support part 13 which extends from the tubular part 9 and which serves as an axial support for the seal 3. In this embodiment, the seal support part 13 is in the form of teeth extending so as to be integral with the tube part 9 in a radial direction, and provided with a peripheral guide surface 14 having a diameter slightly less than the diameter of the conduit in which the pig is intended to be inserted, and therefore slightly less than the maximum diameter of the seal 3.

The guide surface 14 therefore serves on the one hand to centre and guide the pig and in particular the seal 13 on the pig in the conduit and on the other hand to form a rigid axial support for the seal which is preferably a lip seal, for example in the shape of a V, in order to withstand high pressures. When passing a deformed part of a conduit 8, as shown in FIG. 2, the peripheral guide surfaces 14 of the seal support parts 13 come into abutment against the internal surface of the conduit where the diameter is reduced and elastically deform the part of the tube 9 on which they are mounted. The peripheral guide surface 14 is preferably made from a material having a low coefficient of friction in order to reduce the friction forces acting on the pig.

When the tubular part 9 deforms, the seal 3 mounted on the tubular part follows the deformation and provides a good seal between the internal surface of the conduit and the body. This design makes it possible in particular to use a seal, such as a lip seal, adapted to high-pressure uses, for example pressures of around 35 bar, which will substantially increase the length of the cable which can be inserted in a conduit.

Figure 6:
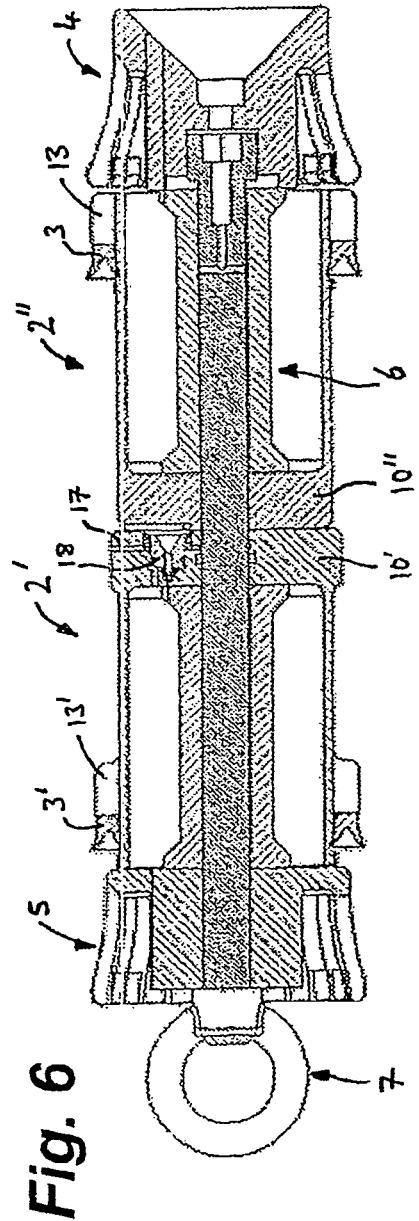
FIG. 6 is a longitudinal section of another embodiment of a pig according to the invention.

In order to lubricate and cool the lips 15 of the seal 3, small radial orifices 16 pass through the tubular part 9 and/or the seal support parts 14, thus forming a passage for the water from the internal cavity 11 to the external space 12 of the body. The number and diameter of the orifices, for example 4 to 8 in number on the periphery of the body, are adapted to supply sufficient water for cooling and lubrication of the joint without for all that causing a significant pressure drop. It is also possible to supply the cooling and lubrication water for the seals 3 through a valve or pressure reducer 18, for example mounted in a cavity in the wall part 10 of the body, this pressure reducer 18 having an inlet communicating with the internal cavity 11 of the body and an outlet 17 communicating with the external space 12. Where the pressure reducer 16 is mounted between two seals 3, 3' on respective bodies 2, 2', as shown in FIG. 3 or FIG. 6, it serves to reduce the differential pressure between the external space 12, 12', 12" and the internal cavity 11, 11', 11" of the bodies. This makes it possible in particular to distribute the thrust load on the two seals 3, 3', 3".

In the embodiment in FIG. 3, the bodies 3', 3 are essentially identical, but it is possible to mount bodies in opposition as shown in FIG. 6, where the radial walls 10', 10' of the bodies 2' and respectively 2" are pressed against one another.

The mounting in opposition according to the embodiment in FIG. 6 makes it possible to increase the distance between the seals 3', 3" and the support parts 13', 13", which can improve the guidance as well as the impermeability of the pig seals.

The pig fixing means 6 can comprise a central spindle 19 disposed along the central axis of the pig and axially compressing the front and rear guidance elements 4, 5 as well as the bodies 2, 2', 2" through sleeves 20 mounted coaxially around the central spindle 19. The sleeves 20 serve to ensure that the open end 21, 21', 21" of the tubular part of the body 9 is free so as to allow its elastic movement. The length of the sleeves 20 is therefore designed so as to leave a certain clearance between the open end 21, 21', 21" of the tubular part and the adjacent element, that is to say an end guidance element 4, 5 or the wall 10' of the adjacent body.

The front and rear guidance elements 4, 5 are advantageously provided with elastic fingers 22 disposed on the periphery and being slightly inclined in order to give an essentially conical shape to the guidance elements. The elastic fingers 22 on the one hand centre the pig in the conduit and on the other hand prevent the pig from becoming attached to the inside of the conduit, in particular with irregularities or discontinuities due for example to the connection of ends of the conduit or to a damaged surface. The elastic fingers also enable the guidance elements to adapt to the internal profile of the conduit.

The front guidance element 4 is advantageously provided with a receptacle with an essentially conical shape or having another splayed shape on its front face in order to house and centre a ferrule mounted on a cable which is to be extracted from a conduit. The pig can thus not only be used for pulling a cable when it is installed in a conduit but also for pushing a cable when it is extracted from a conduit. The centring of the cable ferrule in the splayed front face 23 of the guidance element prevents problems of jamming of the pig in the conduit, in particular when taking bends in the conduit.

The invention claimed is:

1. A pig for installing a cable in a conduit, wherein said pig comprises a body and a seal intended to follow the internal surface of the conduit and arranged to make circumferentially continuous pressure sealing contact therewith, the seal having a V-shaped cross-section with a radially outer side of the V forming a lip including a v-shaped recess within said v-shaped cross section, the body comprising a radially elastic relatively thin wall tubular part on which the seal is mounted, and a radially resilient support part fixed to or integral with the tubular part, being radially inwardly bounded by the thin wall tubular part and having an outer diameter larger than a diameter of a main length of the tubular part and extending radially outward of a center of the V of the seal such that said thin wall tubular part axially supports the seal wherein said seal has radially extending grooves and prevents the lip from reversing when subjected to relatively high pressure, the support part having a guide surface arranged to guide the pig in the conduit, the outer diameter of the guide surface being slightly less than the maximum diameter of the seal, so that the support part is mechanically resiliently deformed by the internal surface of the conduit operating through the guide surface and, in turn, radially deforms the tubular part when the pig passes through deformed parts of the conduit.

2. A pig according to claim 1, wherein the support part is in the form of teeth extending radially in the tubular part, and comprising an axial support of the seal.

3. A pig according to claim 1, wherein the support part is formed integrally with the tubular part.

4. A pig according to claim 3, wherein it comprises at least two bodies and seals.

5. A pig according to claim 4, wherein the bodies are essentially identical and mounted axially in tandem.

6. A pig according to claim 4, wherein the bodies are mounted axially in opposition, the seals being mounted at the opposite ends of the pig.

7. A pig according to claim 4, wherein it comprises a pressure reducer in communication with an annular space between the seals, an internal cavity in the body upstream of the reducer and an external space upstream of the upstream seal through orifices in order to distribute the pressure between the two seals.

8. A pig according to claim 7, wherein it also comprises a front guidance element comprising a conical or splayed front face forming a receptacle for housing a cable ferrule to be extracted from the conduit.

9. A pig according to claim 8, wherein the pig comprises front and rear guidance elements, the guidance elements comprising elastic fingers inclined so as to give an essentially conical shape to the guidance elements.

10. A pig according to claim 9, wherein the tubular part of the body has essentially the shape of a hollow cylinder having an open end and an end at least partially closed by a radial wall, the seal and the support part being disposed close to the open end.

11. A pig according to claim 1, wherein said grooves form teeth which are extensions of side walls of said grooves.

* * * * *